United States Patent
Fitzpatrick et al.

[15] 3,648,226
[45] Mar. 7, 1972

[54] VIBRATION ISOLATION MODULE FOR TOWED CABLES

[72] Inventors: Hugh M. Fitzpatrick, Chevy Chase, Md.; James J. Neville, Kinnelon, N.J.; John Thompson, State College, Pa.; Fitzhugh W. Boggs, deceased, late of Hampton, N.J. (by Elizabeth M. Boggs, executrix)

[73] Assignee: The United States of America as represented by the Secretary of the Navy

[22] Filed: Mar. 23, 1970

[21] Appl. No.: 21,641

[52] U.S. Cl. .................... 340/5 R, 114/235 A, 340/7 R, 340/17
[51] Int. Cl. ........................................................ B63b 21/00
[58] Field of Search ............... 340/5, 7, 17, 3 T; 114/235 A, 114/235 B

[56] References Cited

UNITED STATES PATENTS

| 3,371,311 | 2/1968 | Cholet et al. | 340/17 |
| 3,437,171 | 4/1969 | Davis et al. | 340/3 T |

Primary Examiner—Richard A. Farley
Attorney—R. S. Sciascia and Q. E. Hodges

[57] ABSTRACT

A vibration-isolation link employing pistons or diaphragms responsive to the difference in pressure between the stagnation pressure and the ambient pressure to compensate for the drag force of a towed body and employing a soft spring to maintain the piston or diaphragm in an equilibrium position.

10 Claims, 4 Drawing Figures

INVENTORS
FITZHUGH W. BOGGS
JAMES J. NEVILLE
JOHN THOMPSEN
HUGH M. FITZPATRICK

ATTORNEY

INVENTORS
FITZHUGH W. BOGGS
JAMES J. NEVILLE
JOHN THOMPSEN
HUGH M. FITZPATRICK

BY *O.E. Hodges*

ATTORNEY 3,648,226

VIBRATION ISOLATION MODULE FOR TOWED CABLES

The invention described herein may be manufactured and used by or for the Government of the United States of America for Governmental purposes without the payment of any royalties thereon or therefor.

BACKGROUND OF THE INVENTION

This invention relates to devices which decouple a towed body from the towing cable to isolate the one from vibrations produced by the others. For example, the performance of an instrument planted in a towed body may be adversely affected by vibrations which are transmitted to it from the towing cable. These vibrations may originate from several sources, such as the motion of the towing craft, turbulence of the cable boundary layer, and unstable flow about the cable (vortex shedding). In such a towed system there is combination of steady and time varying forces applied to the cable by the attachments to its end and by fluid reactions along its length. The steady forces are due to the end loads, e.g., weight and fluid drag along the cable as well as the drag and inertial effects of the towed body. The time varying loads are caused by motion of the towing craft, unstable flow (vortex shedding) throughout the cable, turbulence of the cable boundary layer and the turbulent wake of the towing craft.

In the prior art the attempts to solve this problem have been accomplished by inserting an elastic section in the cable or by introducing springs and inertia members into the towing cable line or a third method of vibration damping has been to rely upon the frictional forces generated when the cable is elongated in a special elongating member.

SUMMARY OF THE INVENTION

The present invention consists of a device whose design has been developed to utilize the dynamic forces of the flow of the fluid about the towed body to compensate for the drag forces of the towed body to thereby permit the use of a fairly soft spring to connect the body to the means for towing the body without requiring an excessive or impractical length of spring or subjecting the spring to forces which might exceed its elastic limit. The use of the soft spring is desirable to limit the transmission of low-frequency vibrations from the towing cable to the towed body, the softer the spring the lower will be the frequency of vibration whose transmission will be excluded by the spring. In order to widen the range of vibrations isolated by the device, it may be desirable to combine the mechanism utilizing the soft spring with a hard spring wherein the hard spring tends to attenuate the higher frequencies. In developing this invention, care has been taken to reduce to a minimum any frictional coupling through the link.

It is an object of this invention to provide a vibration isolation link between the towed body and the towing cable;

It is another object of this invention to provide an isolation link which utilizes the dynamic forces generated by the towing of the body through a fluid to compensate for the drag forces of the towed body;

It is another object of this invention to provide a dynamic vibration isolation device which has a relatively short length;

Other objects and advantages and novel features of the invention will become apparent from the following detailed description of the invention when considered in conjunction with the accompanying drawings wherein.

DESCRIPTION OF THE PREFERRED EMBODIMENT

Figure 1:
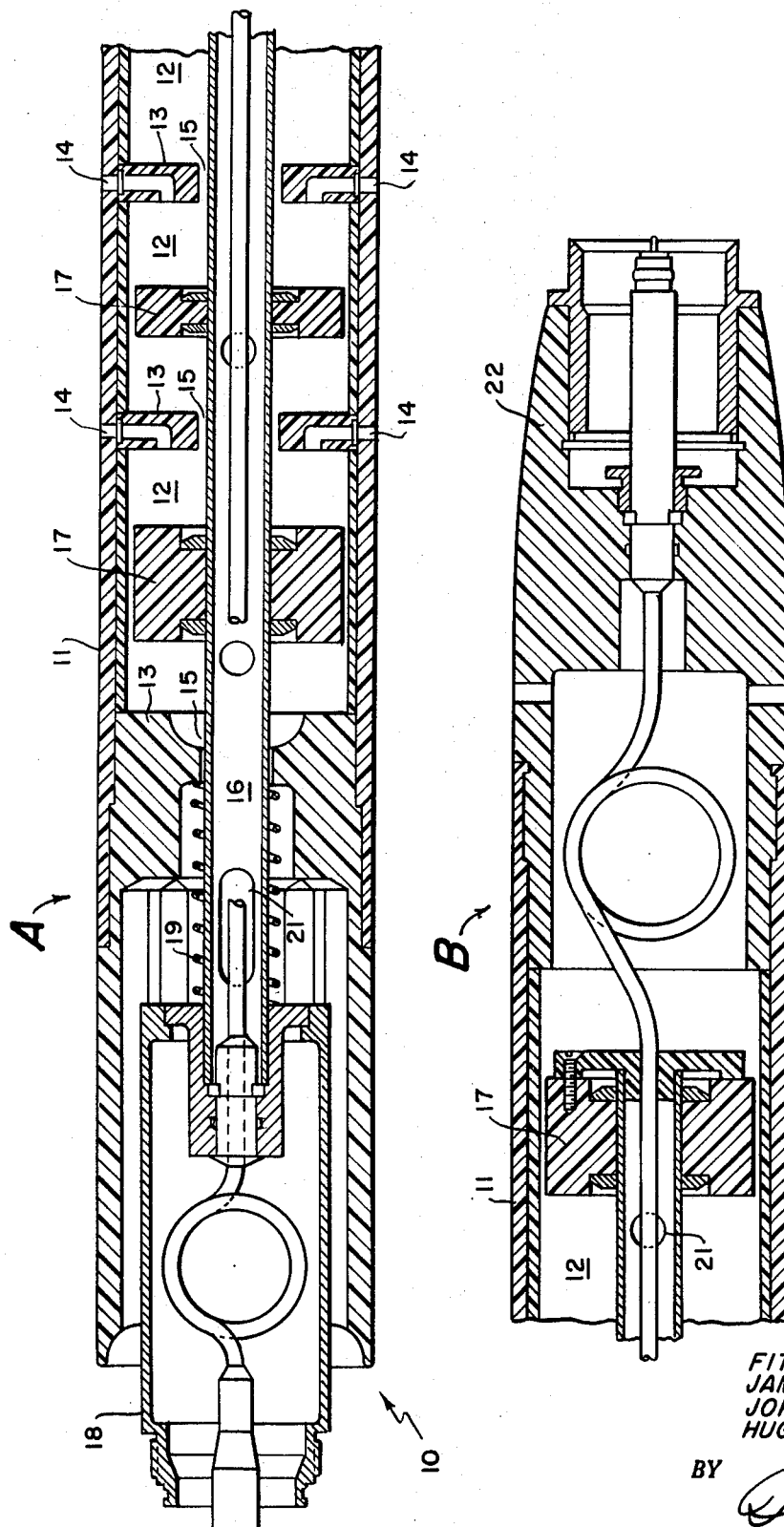
FIG. 1 is a sectional view of a preferred embodiment of the invention.

Referring now to the drawings wherein the same or similar parts are correspondingly numbered throughout the several views, there is shown in FIG. 1 a vibration isolation link 10, shown as sections A and B having a tubular body member 11 within which there is formed a plurality of chambers 12. These chambers are formed by a series of baffles 13. Each of the chambers is vented to the outside of the body in through the baffle as shown in FIG. 1 or directly to the outside through the wall of the chamber by vents 14. Each of the baffles has a central opening 15 through which a longitudinal shaft 16 passes. The shaft 16 is attached at one end to the tow cable. In each of the chambers 12 there is slidably mounted a piston 17 which is attached to the shaft 16. The shaft 16 is attached to the towing cable by a member 18. Interposed between the member 18 and the end one of the baffles 13 there is mounted a spring 19. The end of body 11 adjacent member 18 is designed as a scoop to receive the stagnation pressure as the body is towed through the fluid. The shaft 16 is hollow and has a plurality of openings 21 for communicating the stagnation pressure from the open end of body 11 to the side of each of the pistons nearest to the open end of body 11. The other end of body 11 is closed by a member 22 which may be the means for attaching the vibration isolation device to the body being towed.

It is to be understood that in the design of such an isolation device the factors of the towing speed, the diameter of the body 11 and the size and drag factor of the body being towed have to be considered. In such a design the difference between the stagnation pressure and the ambient pressure, which is a function of the velocity of tow, applied to the total piston area must substantially equal the drag factor of the towed body. In the embodiment shown in FIG. 1 there are a plurality of pistons gauged to the shaft 16 to to increase the total piston area without resorting to a body of excessive diameter. This essential balancing of the dynamic and static forces in the towed system permits the use of a relatively soft spring 19 which provides the only direct connection between the towing cable and the towed body except for incidental and unavoidable frictional factors in the system. For the purposes of this invention this softness of spring 19 may be defined as a spring having a stiffness smaller than about 10 times the product of the effective mass to be connected by this spring to the towing cable and the square of the lowest frequency required to be isolated by the isolation device. From the foregoing description and definitions it becomes apparent that by designing the system to substantially compensate for the drag effects of the towed body and the isolation device itself, it is possible to make the spring 19 quite soft and to thereby isolate the towed body from relatively low frequencies of vibrations. It should also be understood that spring 19 would, in practice, be secured at either end so as to function to resist movement in either axial direction from some neutral point, such neutral point would be selected so that the pistons or diaphragms 17 would be able to move in either axial direction, but would be subject to a small restoring force which would tend to restore the piston to its neutral position, or when necessary, establish a new neutral position.

Figure 2:
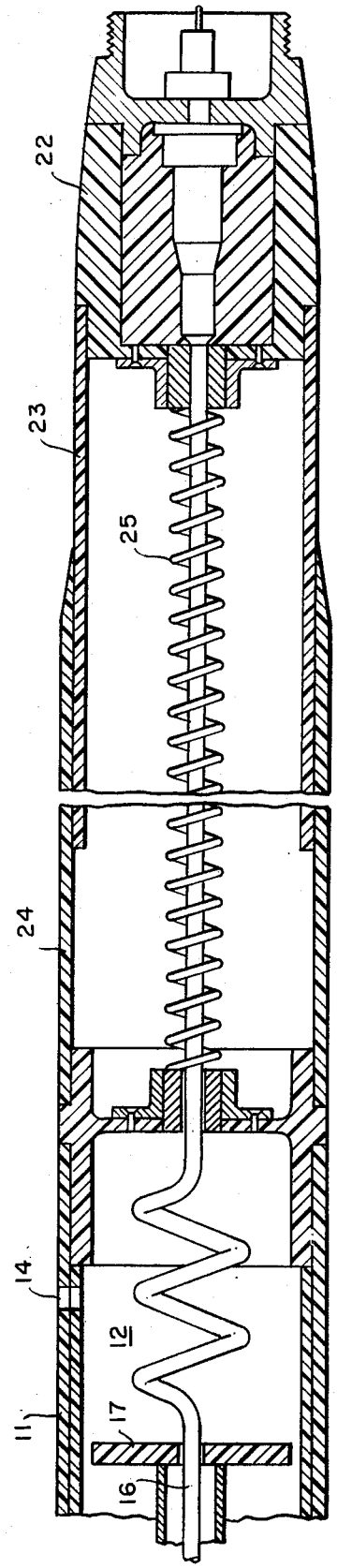
FIG. 2 is a sectional view of a replacement section for section B in FIG. 1.

The modifications shown in FIG. 2 is an addition to the device as shown in FIG. 1 and consists of an elongated section which, for illustration purposes, would replace the section B of FIG. 1. This modification permits the introduction of a hard spring to extend the range of frequencies over which the link will function and specifically tend to isolate the system from high-frequency vibrations. It consists of a member 23 slidably mounted in an extension 24 of body 11 and containing axially mounted therein a tension spring 25. The tension spring 25 is classified as a hard spring, for example a spring having a spring constant of about 1,000 pounds per foot elongation.

Figure 4:
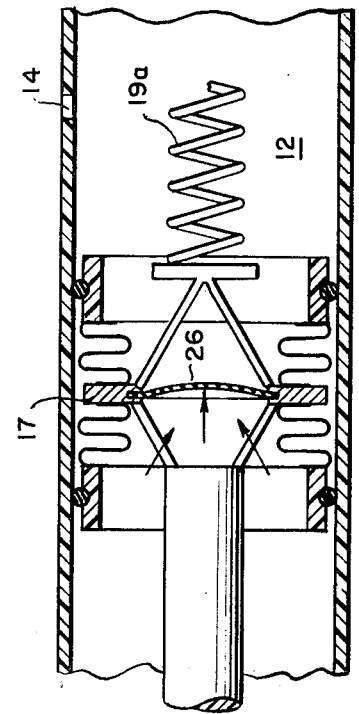
FIG. 4 is a further modification showing in cross section how the thrust shaft may be attached to a diaphragm or piston having a flexible center portion.
Figure 3:
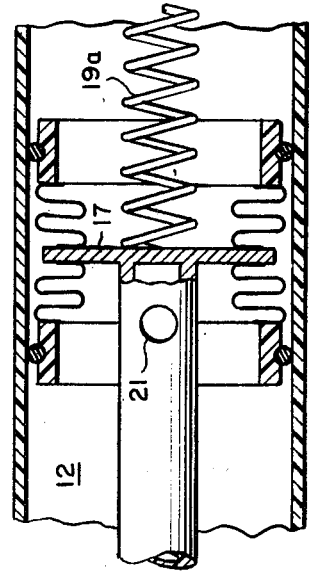
FIG. 3 is a sectional view showing a modified way of attaching the tension carrying shaft to the diaphragm or piston.

FIGS. 3 and 4 are intended to show possible modifications of the structure shown in FIG. 1. In FIG. 3 the concept of mounting the piston in a bellows-type seal is shown. This modification could readily be applied to each of the pistons shown in FIG. 1. The spring 19a shown in FIG. 3 could be substituted for the spring 19 shown in FIG. 1 or vice versa if the spring 19 in FIG. 1 is retained then the spring 19a shown in FIG. 3 could be omitted. It should also be noted that in determining the softness of the spring the elastic contribution of each of the bellows must be considered. The modification illustrated in FIG. 4 is further modifying the structure of FIG. 3 by providing a flexible member in the piston which is designed to relieve the inertial forces of the fluid displaced as the piston adjusts for varying load and vibration conditions. As in FIG. 3 the spring 19a may be utilized in place of the spring 19 shown in FIG. 1 or may be omitted in deference to the present structure of spring 19 as shown in FIG. 1. In each of the devices it is desirable to minimize the frictional coupling between the two parts of the device, that is between the part connected to the towline and that part connected to the towed body to thereby minimize the transmission of longitudinal vibrations or longitudinal components of vibration in either direction through the link. In the modifications as shown in FIGS. 3 and 4 it may be desirable to mount the bellows seals for sliding engagement with the wall of the chamber 12 in which it is located to allow for piston movements which might exceed the allowable bellows movement. Also in the modification of FIG. 4 care must be taken to leave the flexible diaphragm 26 free to respond to changes in the inertial force of the displaced fluid.

In operation this isolation link 10 develops a difference in pressure between the stagnation pressure at the end facing the direction of tow and the ambient pressure surrounding the link 10 which when applied to the piston or diaphragms in the link substantially compensates for the drag forces of the towed body, ideally the dynamic forces would exactly compensate for the drag forces. It may be noted that by utilizing known design principles it would be possible to design the link to modify the ambient pressure present at the ports 14. In understanding the operation of this invention, as it is described in the foregoing specification, it should be clear that as used, the terms "stagnation pressure" and "ambient pressure" denote any two pressures which are different as a result of the fluid flow about the system. Also the term bellows is used to denote any flexible part or attachment of the piston or diaphragm which functions to relieve the frictional constraint imposed by the sliding seal with respect to the small vibratory motions of the piston or diaphragm relative to the chamber within which the seal slides in accommodating to the larger movements associated with the adjustments of the operating position of the piston or diaphragm.

The inventive concept is intended to include applications which involve only reversal of parts such as pushing a body through a fluid rather than towing which merely involves changing the compensating structure to compensate for compressive forces rather than tension forces.

Obviously many modifications and variations of the present invention are possible in the light of the above teachings. It is therefore to be understood that the invention may be practiced otherwise than as specifically described.

What is claimed is:

1. A vibration-isolation link placed within a towing system between a towing craft and a body towed in a fluid, said link comprising:

a first means attached to a tow cable, said tow cable being in tension between said link and said towing craft;

a second means coupled to said first means to transmit the tension force to the towed body;

means interconnecting said first and second means for substantially decoupling said first and second means over a desired range of frequencies of vibration for which isolation is desired; and means responsive to the fluid dynamic forces produced by the movement of the link through the fluid to substantially compensate for the end load produced by the towed body.

2. A vibration isolation link as claimed in claim 1 in which said means interconnecting said first and second means is a spring.

3. A link as claimed in claim 2 which said spring is a soft spring.

4. A vibration isolation link as claimed in claim 1 in which said first means includes a rod and one or more pistons attached to said rod;

said second means includes one or more chambers corresponding in number to the number of pistons;

said rod extending into each of said chambers;

each of said chambers containing one of said pistons axially movable therein;

means in each of said chambers for venting each of said chambers to the ambient pressure on the one side of its respective piston;

means in said rod for admitting the stagnation pressure to each of the chambers on the side of its respective piston opposite to the side to which the ambient pressure is admitted; and said piston area subjected to the difference in pressure between the stagnation and ambient pressures being sufficient to substantially compensate for the drag force of the towed body.

5. A link as claimed in claim 4 in which said rod is hollow;

said rod having a port to receive said stagnation pressure and a port in each of said chambers for admitting said stagnation pressure to said pistons, the ends of said rod being closed.

6. A link as claimed in claim 4 in which said pistons have bellows seals.

7. A link as claimed in claim 6 in which said bellows seals are slidable within said chambers.

8. A link as claimed in claim 1 in which said interconnecting means includes a first and a second spring said first spring being a soft spring and said second spring being a hard spring;

said springs being mounted coaxially of said link with said first spring being effective to isolate the low-frequency vibration and said second spring being effective to isolate said high-frequency vibrations.

9. A vibration-isolation towing link as claimed in claim 1 in which said means responsive to fluid dynamic forces includes a diaphragm whose two sides are selectively connected to the immersing fluid in such manner as to produce a differential pressure responsive to the speed of flow of the immersing fluid and means applying the tension force to said diaphragm.

10. A link as claimed in claim 9 which includes a diaphragm compliantly responsive to fluctuating pressures attendant to fluctuations in the extension of said link at frequencies which the link is designed to isolate.

* * * * *